United States Patent [19]
Feinbloom

[11] Patent Number: 5,087,112
[45] Date of Patent: Feb. 11, 1992

[54] OPTICAL MAGNIFIER APPARATUS
[75] Inventor: Richard E. Feinbloom, New York, N.Y.
[73] Assignee: Designs For Vision, Inc., Ronkonkoma, N.Y.
[21] Appl. No.: 554,472
[22] Filed: Jul. 19, 1990
[51] Int. Cl.⁵ .......................... G02B 27/02; G02B 7/02
[52] U.S. Cl. .................... 359/800; 359/798; 359/805; 359/818; 359/802
[58] Field of Search .............. 350/258-265, 350/276 SL, 431, 433, 319, 235-251; 362/257, 268, 311, 351-357, 362, 367

[56] References Cited
U.S. PATENT DOCUMENTS

| | | | |
|---|---|---|---|
| 1,784,168 | 12/1930 | Sander | 350/235 |
| 2,087,081 | 7/1937 | Bock | 350/237 |
| 2,092,672 | 9/1937 | Hyatt | 350/235 |
| 2,905,054 | 9/1959 | Logan | 350/251 |
| 3,600,064 | 8/1971 | Walz | 350/236 |
| 4,206,978 | 6/1980 | Leopoldi | 350/242 |
| 4,335,421 | 6/1982 | Modia et al. | 350/172 |
| 4,567,123 | 1/1986 | Ohtaka et al. | 350/431 |
| 4,763,986 | 8/1988 | Sego | 350/235 |
| 4,859,032 | 8/1989 | Feinbloom | 350/235 |

FOREIGN PATENT DOCUMENTS

| | | | |
|---|---|---|---|
| 220337 | 7/1957 | Australia | 350/235 |
| 561222 | 10/1957 | Belgium | 350/235 |

Primary Examiner—Bruce Y. Arnold
Assistant Examiner—Thong Nguyen
Attorney, Agent, or Firm—Arthur L. Plevy

[57] ABSTRACT

A magnifying assembly of the type employing a lens surrounded by a plastic or metal holding is placed in a light diffuser, which light diffuser is an annular member having an open top which is associated with a peripheral flange upon which the magnifying lens rests. The member has a bottom opening which is associated with an annular curved flange which is abraded so as to uniformly diffuse light over the surface of a document to be read whereby the area enclosed by the bottom opening of the annual member is uniformly illuminated by a light source.

11 Claims, 2 Drawing Sheets

OPTICAL MAGNIFIER APPARATUS

BACKGROUND OF THE INVENTION

This invention relates to magnifying apparatus and more particularly to a source of illumination for a magnifier.

As one can ascertain, the prior art is replete with numerous patents and other materials which show magnifying lens systems to enable a person to view objects more clearly. As is well known, with the aid of a magnifying glass or a microscope it is possible to bring the object very close to the eye and yet view it as though it were comfortably within the eye's range of accommodation. This is the range of distance within which one can produce a sharply focused image on the retina. As is also well known, the magnifying power of a microscope or a magnifying glass is the ratio of the apparent size of the image of an object formed by the instrument to that of the object seen by the naked eye. Various optical aids have been used to enable close viewing. Many of these optical aids come with a built in light source which enables one to utilize the magnifying glass or the microscope assembly to view various items or objects with the additional light source illuminating the field of view. Such prior art magnifiers present many problems in regard to the nature of the illumination in regard to glare which is caused by the source of illumination and while, in general, are effective to provide magnification, there are various problems associated with the apparatus. As indicated, many of the problems result in glare which emanates from the illumination source as well as uneven illumination of the object to be viewed by the magnifying system. Hence the prior art was cognizant of such problems and offered various solutions. See, for example, U.S. Pat. No. 4,859,032 entitled HAND HELD MAGNIFIER APPARATUS, issued on Aug. 22, 1989 to Richard E. Feinbloom, the inventor herein and assigned to Designs For Vision, Inc., the assignee herein. That patent describes a hand held magnifying apparatus which employs a composite housing. The housing includes a first housing assembly which holds first and second magnifying lenses and which is terminated in a cylindrical hood. A power source is contained in an angled housing which operates to illuminate the object to be viewed by providing a light pattern from the illumination source which light pattern is changed from an elliptical to a circular pattern to thereby uniformly illuminate the text or material to be viewed via the magnifying lens assembly. This is an extremely efficient device but, as indicated above, is a complete and relatively expensive device. As one can ascertain, there are many different types of magnifying assemblies which exist in the prior art. One type of optical magnifier for reading a document comprises a lens enclosed in a metal or plastic sleeve. The user of the magnifier holds the magnifier sleeve and positions the lens over a document to be read. The document is illuminated by ambient light passing through the lens and under the magnifier. This light is reflected back to the user.

In using this particular system, shadows are cast on the document by the magnifier sleeve, by the user's hand and other objects close to the magnifier. Thus the viewing area is not fully or well lighted and the reading process becomes impaired. Such magnifier assemblies as indicated above which essentially comprise a lens enclosed in a metal or plastic sleeve, come in various powers and hence the user can employ different lens assemblies for different reading tasks. While there are devices as shown, for example, in U.S. Pat. No. 4,859,032, which can provide a constant source of illumination, these devices are relatively expensive.

Thus apparatus which will enable one to view a text or other material with uniform illumination in a simple and economical form would be extremely advantageous. The apparatus should have the ability to support a typical magnifying lens which is enclosed in a metal or plastic sleeve while further providing a source of uniform illumination for the supported magnifying lens.

SUMMARY OF THE INVENTION

The above-described problems present in optical magnifiers are solved in the present invention by the provision of a light diffuser which serves the dual purpose of supporting the optical magnifying lens while diffusing light to cause a uniform illumination pattern to be provided. The light diffuser comprises an annular member which is fabricated of glass or other plastic and formed to receive a light source at any point along a sidewall. The light from the source is diffused by means of an abraded area associated with the light diffuser and the light diffuser operates to transmit light from the light source in a uniform pattern over the surface of the document to be read. The surface of the document is uniformly and brightly lighted within the annular opening of the diffuser member.

DETAILED DESCRIPTION OF THE DRAWINGS

Figure 1:
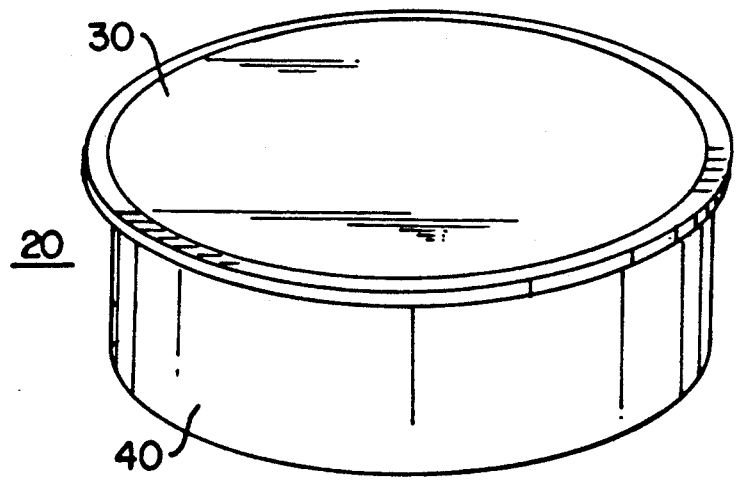
FIG. 1 is a perspective view of an optical magnifier apparatus used in this invention.

Referring to FIG. 1 there is shown a conventional optical magnifier assembly 20 which is employed with this invention. The magnifier assembly includes a magnifying lens assembly 30 which is seated in the metal or plastic sleeve 40. If desired, a handle (not shown) may be secured to the sleeve 40. The magnifier may be a single or multiple lens configuration which will enable one to obtain effective magnification. A typical magnifying assembly employing lens 30 will desirably have an effective magnification between 32 to 64 diopters or between 8 to 16 times magnification. Such a lens system has a short focal length because of the magnification necessary and the diameter of a typical lens is approximately 1½ inches. The member shown has an effective height of about 1 inch with a diameter as indicated above of about 1½ inches and has an effective magnification of ten times. This is a typical example of a magnifying assembly. It should be noted that the present embodiment should not be limited to a single magnifying lens with a single magnification, and that other magnifying lenses with different magnifications could be substituted of the one described above.

Figure 2:
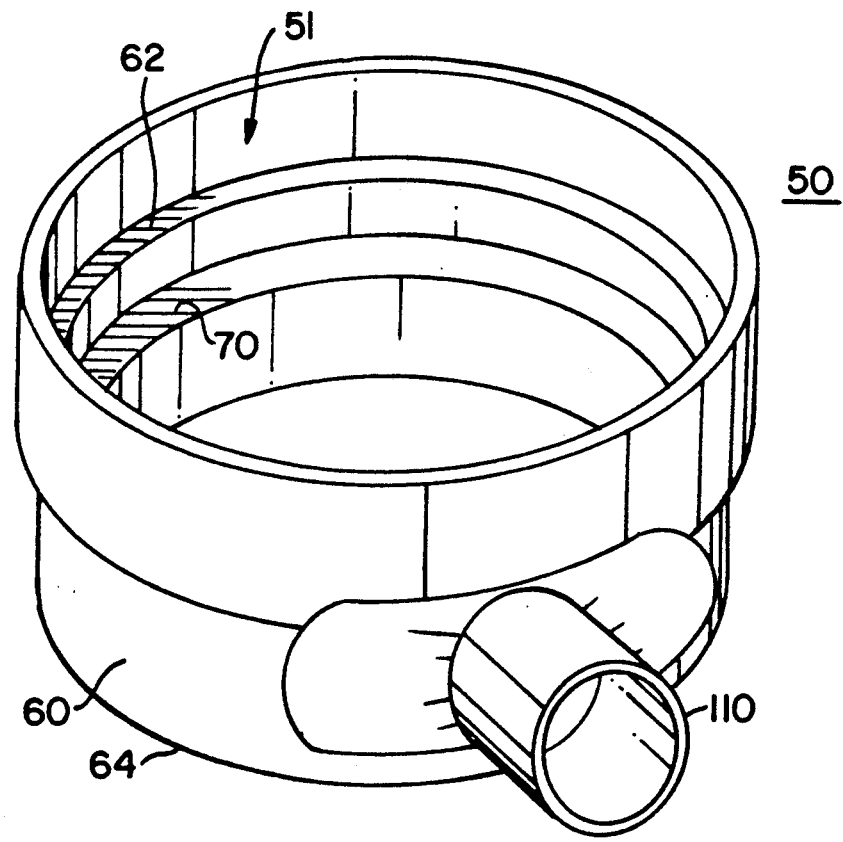
FIG. 2 is a perspective view of a light diffuser used with the optical magnifier of FIG. 1.
Figure 3:
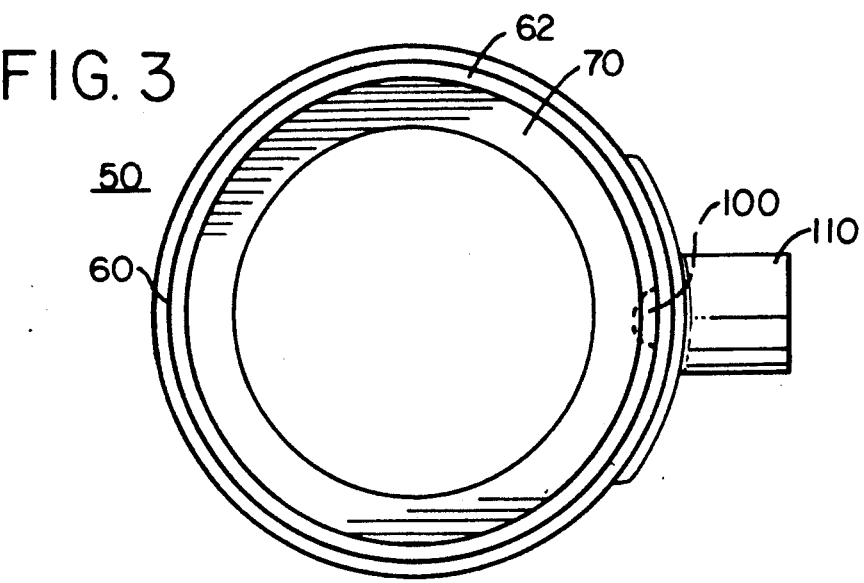
FIG. 3 is a top plan view of the light diffuser of FIG. 2.
Figure 4:
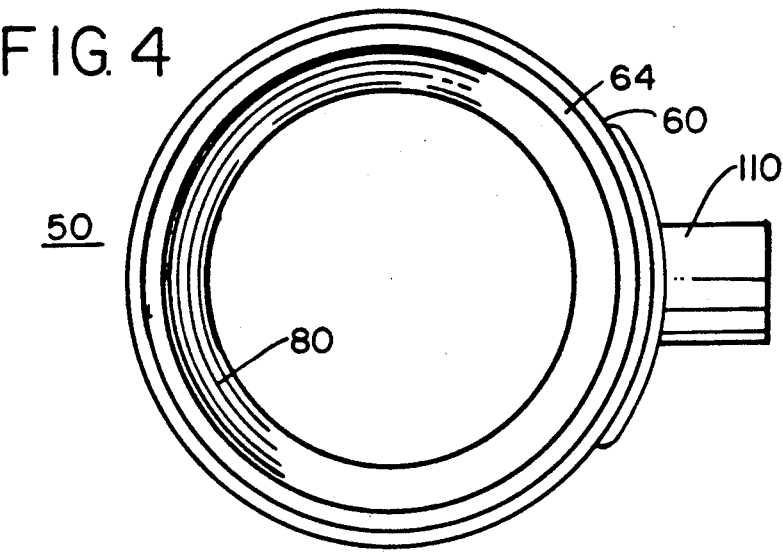
FIG. 4 is a bottom plan view of the light diffuser of FIG. 2.

Referring to FIGS. 2, 3 and 4 there is shown an annular light diffuser member 50. The member 50 may be fabricated from a glass or plastic and, as will be explained, operates to both support and provide a uniform illumination pattern for the magnifier of FIG. 1. The light diffuser 50 is an annular member or a hollow tubular member having a sidewall 60 with a top opening 62 and a lower opening 64. As seen, the sidewall 60 of the diffuser has an input light port 110 which, as will be explained, accommodates a typical light source such as a flashlight or penlight assembly or a fiber optic cable which is inserted into the cylindrical light port 110. The light input port 110 is associated with an aperture 100 in the sidewall the diffuser member 50. The aperture 100 is shown in FIG. 3 and has a spherical shape which conforms to the shape of the light source. Located a small distance below (⅛"), the top opening 62 of the light diffuser 50 is a peripheral flange 70, which peripheral flange 70 has a top polished surface so as to reduce the glare that the eye would receive from light reflected through the flange 70. An upstanding peripheral flange 51 surrounds the flange section 70 and is utilized to accommodate and surround the cylindrical lens assembly 20 as is shown in detail in the cross-sectional view of FIG. 5. Thus, as one can see from FIG. 5, the magnifier assembly of FIG. 1 is adapted to be inserted into the top opening of the light diffuser 50 whereby the bottom surface of the magnifier assembly rests upon the flange 70 and is surrounded by the upstanding flange 51 at the top open surface. The magnifier assembly as shown rests on the peripheral flange 70 since the height of the diffuser 50 is such that the magnifier is in focus with print on the paper 116. However, the magnifier can be adjustably mounted with respect to the diffuser 50 to allow one to vary the focus.

Figure 5:
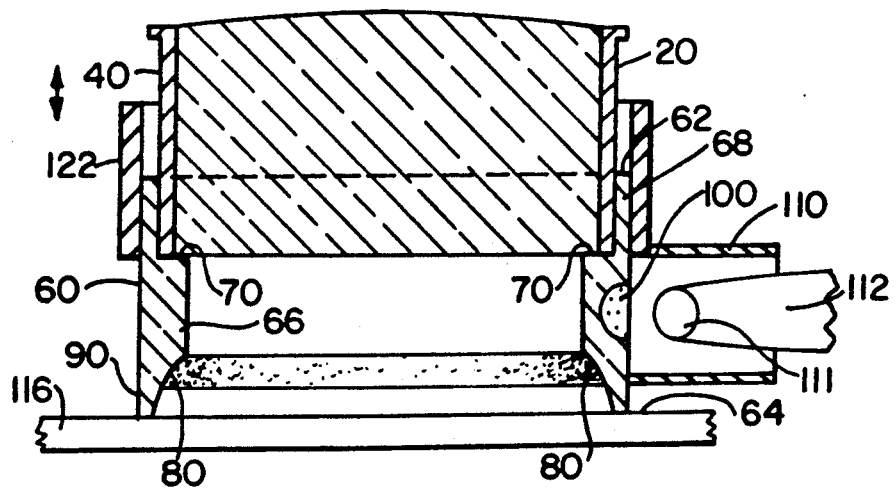
FIG. 5 is a sectional view of the magnifier apparatus being accommodated by the light diffuser.

Thus, as one can more readily understand by referring to FIG. 5, the upper wall portion 68 has a suitable small thickness and the diameter of the opening defined thereby is dimensioned to receive the magnifying glass 20. This thin portion of the wall of the diffuser extends downwardly a distance to the thicker wall portion 66. The thicker wall portion 6 thus accommodates the flat horizontal surface 70 which is the above-noted flange and allows the magnifying glass to rest on the flat flange surface 70. At the lower end, the thicker wall portion 66 terminates in a surface 80 which is slanted downwardly to a lower wall portion 90 which is about the same thickness as the upper wall portion 68 of the diffuser. The slanted surface 80 thus faces towards the bottom open end of the diffuser 50. The surface is slanted at a typical angle of about 45 degrees. The slanted surface or area 80 of the diffuser is roughened or abraded so that it can also reflect light in various random manners. Surface 80 may be abraded or roughened by typical techniques including the use of etching, machine techniques, and so on. Techniques for abrading plastic or glass to provide roughened surfaces are well known.

As seen in both FIGS. 3 and 5, a depression or aperture 100 is provided in the sidewall of the diffuser which essentially is formed in the thicker wall portion 66 thereof. The hole or aperture is formed in the thick wall portion but does not penetrate into the annular opening portion of the diffuser. In any event, light can be introduced into the diffuser from any direction as from the top, bottom and so on. In this embodiment, since the sidewall has a large surface area, the approach of introducing light into the sidewall is employed. The rigid sleeve 110 is secured to the outer wall of the diffuser and is aligned with the hole and is adapted to receive a light source 112 such as a flashlight whose bulb 114 can enter or lie close to the hole in the sidewall of the diffuser. The light source is shown as a bulb 114 but can be a fiber optic cable or any other device which essentially allows light to be inserted into the sidewall via the aperture 100. The surface area of the aperture 100 is also abraded or roughened.

In employing the magnifier and diffuser apparatus of the invention, the diffuser 50 is seated on the surface of a document 116 to be read, with its lower end 64 resting on the document and with the slanted surface 80 facing the document and with the magnifying glass 20 seated on the diffuser resting on the flange 70. The light source or other source of light is inserted into the sleeve 110 and into or held close to the hole 100 and is thereby turned on. Light enters the ring due to the diffusion afforded by the aperture 100. Because the cylinder is transparent with polished sides, the light is reflected and bounces around inside the annular member. The light stays within the annular member due to the differences in the refractive indexes between air (1.00) which surrounds the housing and glass (1.53) or plastic (1.49). The light which bounces about the housing interacts with the roughened surface 80 which is transilluminated and illuminates the surface of the paper 116. Light flows through the thicker wall portion onto the document then around the thicker wall portion in all directions. Some of this light which flows through the thicker wall portion reaches the slanted surface 80 which is transilluminated. In this manner, considerable light flows at all angles from the slanted surface onto the surface of the document. The totality of light rays which thus reaches the surface of the document produces a fully, brightly lighted area of the same diameter as the lower end of the diffuser. This area is uniformly illuminated without any glare or substantial problems as exhibited by prior art devices. With the document thus fully and brightly lighted, the user is able to read with ease. It is, of course, understood that the light source 112 which is directed into the sleeve 110 can be permanently secured thereto. The light which impinges upon the roughened surface 80 of the above-noted diffuser is transilluminated or reflected in many different directions to provide a relatively constant source of illumination due to many different paths that the light is reflected onto the surface of the text 116. This random reflection which is caused by the roughened surface 80 produces a uniform illumination pattern. The outer peripheral area of the diffuser 50 such as the outer sidewalls of the diffuser can also be coated with either a light absorbing material such as a dark tape, a dark paint or the entire outer periphery of the diffuser can be covered by means of a plastic or metal shell, or a light reflective material such as light tape or paint. In this manner, one can further increase the intensity of illumination as desired. In a similar manner, the shell can be adjustable so that it can be lowered or raised to enable a variation in the amount of illumination. FIG. 5 shows a shell 122 which, for example, may be made from an opaque plastic or metal and which shell slides in the direction of the arrows to cover or uncover the peripheral surface of the light diffuser member 50 in a selected manner. This will control the intensity of the illumination pattern on the surface of the text.

I claim:

1. An optical magnifier apparatus including a magnifier glass and a support for said magnifier glass, said support being adapted to rest on a document to be read, wherein said support comprises a hollow tubular member having a sidewall, an open upper end which receives said magnifier glass and an open lower end which rests on a document to be read, and means for introducing light into said sidewall, said sidewall including light exit means, said light exit means including a roughened slanted wall on an inner surface of said sidewall wherein said slanted wall faces toward said open lower end of said support and is adapted to face a document on which said support is seated, and said light exit means permits light to exit said sidewall to be reflected in different directions to uniformly illuminate a portion of the hollow of said tubular member proximate said lower end thereof.

2. The apparatus defined in claim 1, wherein said sidewall is fabricated from a light conducting material and includes a depression into which a source of light can be inserted for the purpose of causing light to flow into said sidewall.

3. The apparatus defined in claim 2, wherein said sidewall has an outer surface and said depression is in said outer surface.

4. The apparatus defined in claim 3 and including a sleeve secured to the outer surface of said sidewall of said support in alignment with said depression, said sleeve being adapted to receive a source of light.

5. The apparatus defined in claim 4, wherein said sleeve is generally tubular and can receive a tubular flashlight.

6. The apparatus defined in claim 1, wherein said slanted wall is annular.

7. An optical magnifier apparatus comprising:
a support adapted to support a magnifier glass over a document to be read,
said support comprising a tubular member having a sidewall with open upper and open lower ends,
a thickened wall portion comprising a portion of said sidewall and disposed between said open upper end and said open lower end of said support,
an annular horizontal flat surface at an upper end of said thickened wall portion and spaced from said open upper end,
an annular slanted surface at a lower end of said thickened wall portion and spaced above said open lower end of said sidewall, said slanted surface facing toward said open lower end of said sidewall and thus adapted to face the surface of a document on which said support is placed, said slanted surface being roughened to reflect light in different directions when light impinges on said roughened surface, and
a depression in said thickened wall portion of said sidewall but not extending through said thickened wall portion, said depression being adapted to receive a source of light such that light from said source can enter into said thickened wall portion and exit said thickened wall portion through said slanted surface to uniformly illuminate the surface of a document to be read.

8. The optical magnifier apparatus according to claim 7, wherein said support is fabricated from a light conducting material.

9. The optical magnifier apparatus according to claim 8, wherein said material is a clear plastic.

10. The optical magnifier apparatus according to claim 7 further including a light absorbing layer covering the outer surface of said sidewall of said tubular member.

11. The optical magnifier apparatus according to claim 7, further including a light reflecting layer covering the outer surface of said sidewall of said tubular member.

* * * * *